United States Patent
Turnbull et al.

(10) Patent No.: US 6,392,326 B1
(45) Date of Patent: May 21, 2002

(54) FLOW-THROUGH SPACEBLOCKS WITH DEFLECTORS AND METHOD FOR INCREASED ELECTRIC GENERATOR ENDWINDING COOLING

(75) Inventors: Wayne Nigel Owen Turnbull, Clifton Park; Todd Garrett Wetzel, Niskayuna; Christian Lee Vandervort, Voorheesville; Samir Armando Salamah, Niskayuna; Emil Donald Jarczynski, Scotia, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/741,896

(22) Filed: Dec. 22, 2000

(51) Int. Cl.[7] ............................ H02K 1/32; H02K 3/24; H02K 9/04
(52) U.S. Cl. ............................ 310/270; 310/61; 310/65
(58) Field of Search .............................. 310/270, 52, 58, 310/59, 61, 64, 65, 60 R, 60 A

(56) References Cited

U.S. PATENT DOCUMENTS

| | | | |
|---|---|---|---|
| 2,425,997 A | 8/1947 | Criner et al. | 171/252 |
| 2,778,959 A * | 1/1957 | Kilner | 310/64 |
| 2,786,951 A | 3/1957 | Morgan | 310/61 |
| 2,833,944 A | 5/1958 | Willyoung | 310/61 |
| 2,844,746 A * | 7/1958 | Coggeshall | 310/270 |
| 2,904,708 A * | 9/1959 | Willyoung | 310/64 |
| 3,225,231 A | 12/1965 | Kudlacik | 310/64 |
| 4,335,324 A | 6/1982 | Fujioka et al. | 310/61 |
| 4,546,279 A | 10/1985 | Hammer et al. | 310/59 |
| 4,709,177 A | 11/1987 | Kaminski | 310/59 |
| 5,252,880 A | 10/1993 | Kazmierczak et al. | 310/270 |
| 5,644,179 A | 7/1997 | Staub et al. | 310/65 |
| 6,204,580 B1 * | 3/2001 | Kazmierczak | 310/52 |
| 6,252,318 B1 * | 6/2001 | Kazmierczak | 310/61 |
| 6,339,268 B1 * | 1/2002 | Kaminski et al. | 310/61 |

FOREIGN PATENT DOCUMENTS

JP  2000-350412  * 12/2000  ............ H02K/9/04

OTHER PUBLICATIONS

U.S. application Ser. No. 09/739,361, filed Dec. 19, 2000.
U.S. application Ser. No. 09/739,360, filed Dec. 19, 2000.
U.S. application Ser. No. 09/739,359, filed Dec. 19, 2000.
U.S. application Ser. No. 09/739,358, filed Dec. 19, 2000.

* cited by examiner

Primary Examiner—Burton S. Mullins
(74) Attorney, Agent, or Firm—Nixon & Vanderhye PC

(57) ABSTRACT

A gas cooled dynamoelectric machine is provided that includes a rotor having a body portion, axially extending coils, endwindings, and a plurality of spaceblocks disposed between the endwindings, so that a plurality of cavities are defined between mutually adjacent endwindings and spaceblocks. To increase endwinding cooling, at least one of the spaceblocks has a passage extending between first and second adjacent cavities to provide for cooling flow communication between the first and second cavities through the spaceblock. A flow deflector is preferably provided adjacent a radially inner end of one, the other, or both of the cavity facing surfaces of the spaceblock for directing flow into or out of the first and second cavities, respectively.

21 Claims, 5 Drawing Sheets

FLOW-THROUGH SPACEBLOCKS WITH DEFLECTORS AND METHOD FOR INCREASED ELECTRIC GENERATOR ENDWINDING COOLING

BACKGROUND OF THE INVENTION

The invention relates to a structure and method for increasing the heat transfer rate particularly in the center and corners of endwinding cavities to increase overall cooling effectiveness in generator and rotor endwinding.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating endwinding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements—which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed— the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

BRIEF SUMMARY OF THE INVENTION

The above-mentioned needs are addressed by the present invention, in which enhanced cooling of generator rotors is achieved by the use of flow-through spaceblocks to promote better flow circulation in the normally starved cavity center and corners, thus increasing the flow heat transfer rate. The invention further relates to the use of coolant flow deflectors to enhance coolant flow into and from the cooling cavities.

Accordingly, as an embodiment of the invention, a gas cooled dynamoelectric machine is provided that comprises a rotor having axially extending coils, endwindings, and at least one spaceblock located between adjacent the endwindings so as to define first and second cavities adjacent the spaceblock between mutually adjacent endwindings. At least one of the spaceblocks has at least one passage defined therethrough to provide for cooling flow communication between the first and second cavities through the spaceblock. The number of passages in each spaceblock may be appropriately determined by the circumferential position of the spaceblock.

By providing a flow of cooling gas between the mutually adjacent cavities, the flow-through passage(s) improve the inherent gas flow patterns generated by the rotating endwindings. This results in increased heat removal capability while maintaining low cost, simplicity and reliable construction. In addition, the improved passive cooling system will increase the current carrying capability of the rotor, producing an increased output rating for the generator.

According to a further feature of the invention, a flow deflector is provided either on the upstream side or the downstream side, or both sides, of the spaceblock(s) to direct coolant fluid flow radially outwardly into the respective cooling cavity, in the case of the upstream flow deflector, or to encourage a smooth and continuous return flow to the annular region, in the case of the downstream flow deflector. The combination of both flow-through passages and deflectors, according to a presently preferred embodiment of the invention, will promote flow of high momentum coolant in the cavities thus reducing or eliminating regions of stagnant or low momentum flow at the cavity corners and center, in particular.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
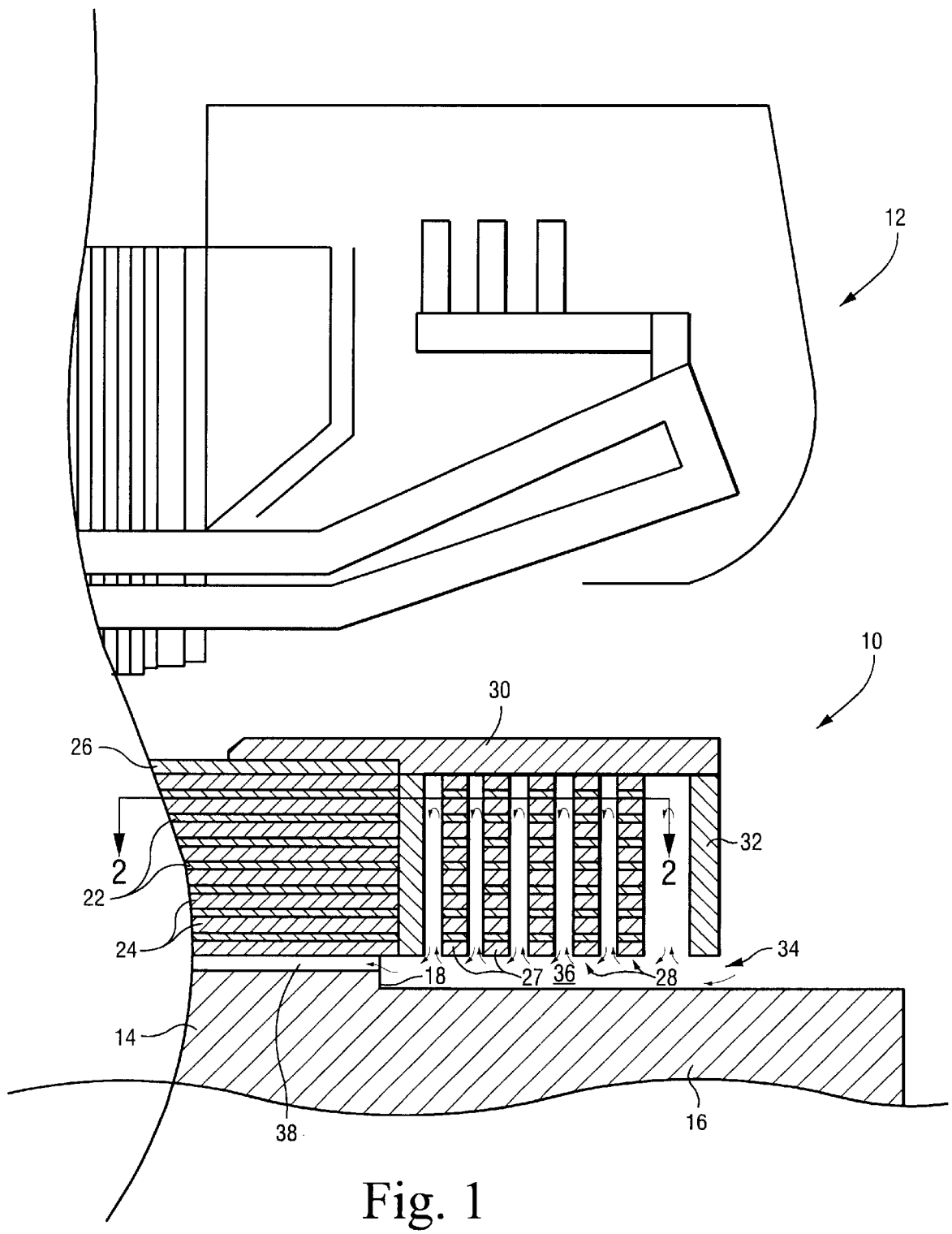
FIG. 1 is a cross-sectional view of a portion of the end turn region of dynamoelectric machine rotor with stator in opposed facing relation thereto.
Figure 2:
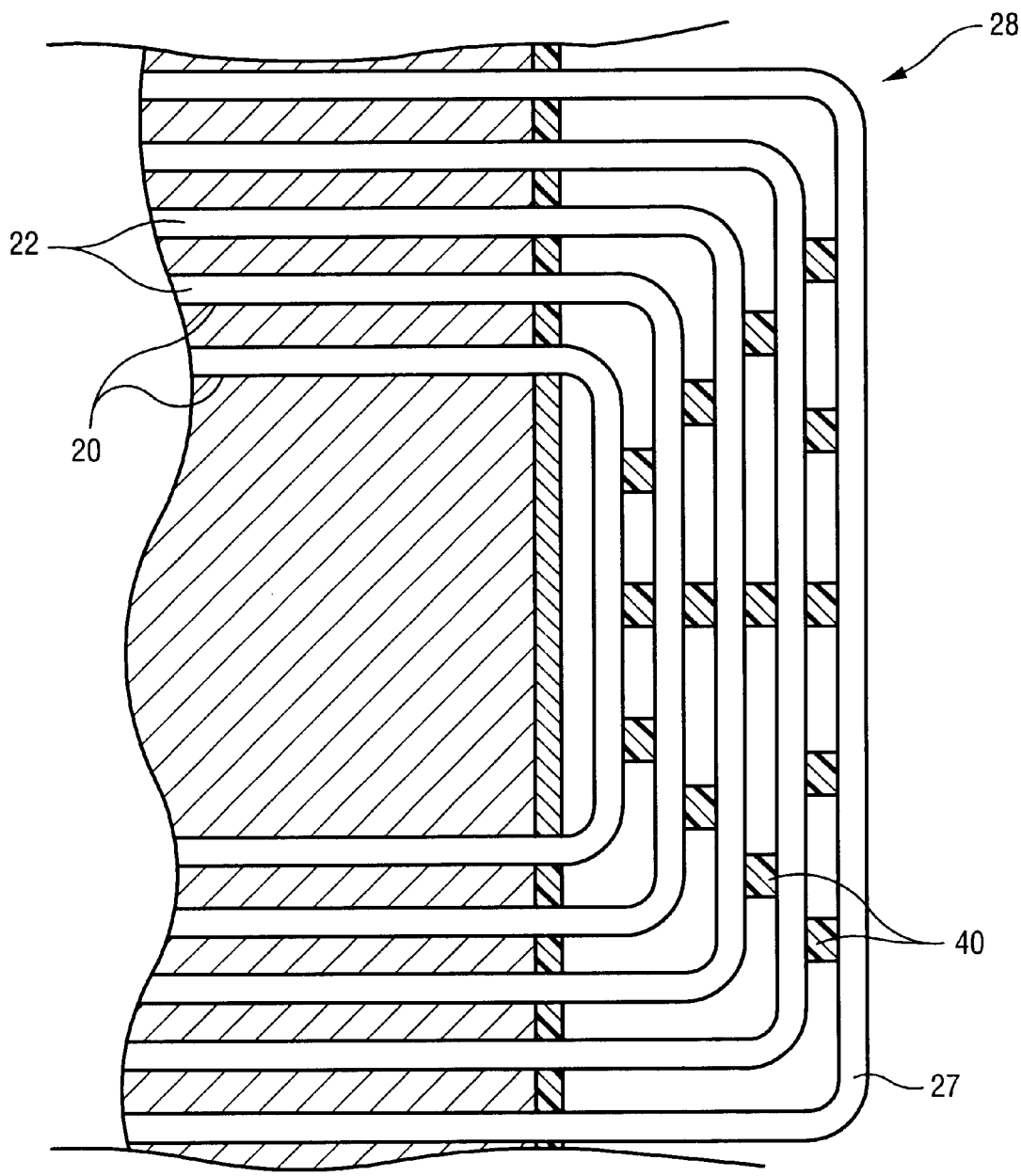
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 22. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner diameter of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns 27 (hereinafter endwindings) are divided into cavities. These cavities are bounded on the top by the retaining ring 30 and on four sides by adjacent endwindings 28 and adjacent spaceblocks 40. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. Air flow is shown by the arrows in FIGS. 1 and 3.

Figure 3:
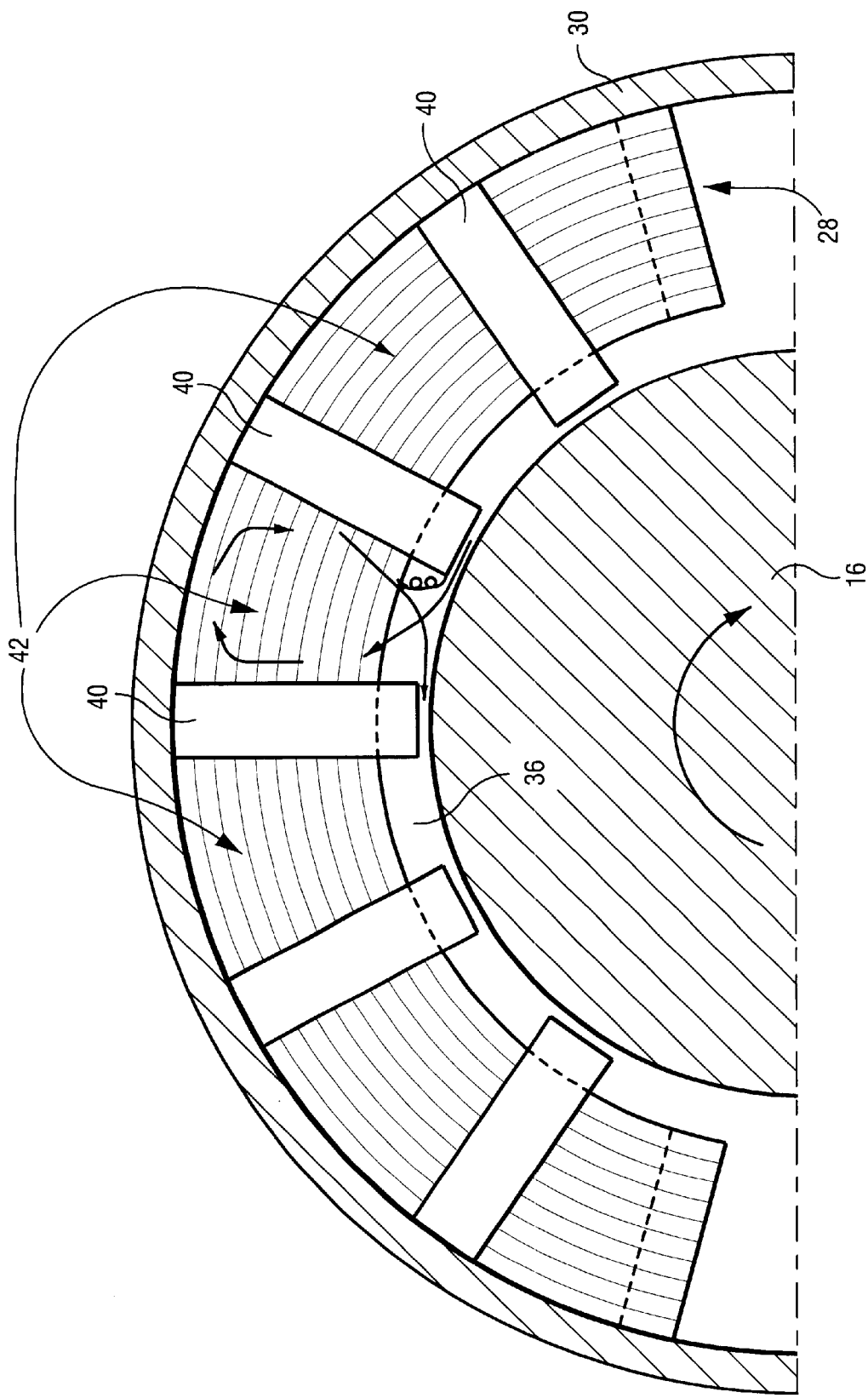
FIG. 3 is a schematic illustration showing passive gas flow into and through endwinding cavities.
Figure 4:
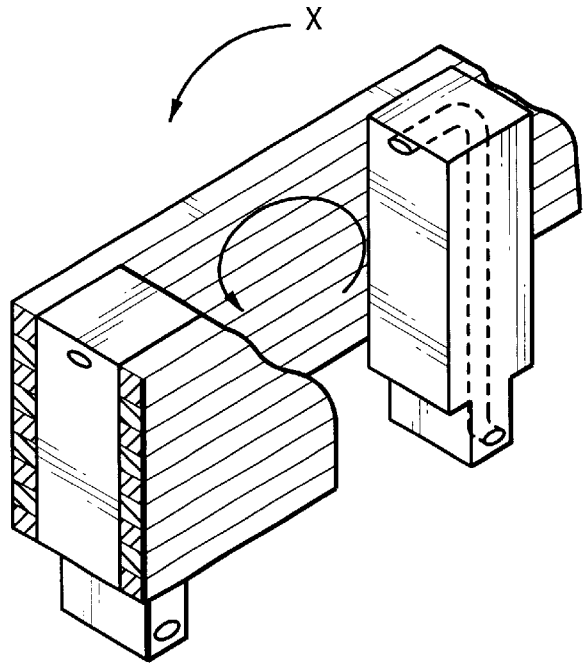
FIG. 4 is a perspective view, partly broken-away of a portion of the rotor end turn region in accordance with a first embodiment of the invention disclosed in U.S. Pat. No. 5,644,179.
Figure 5:
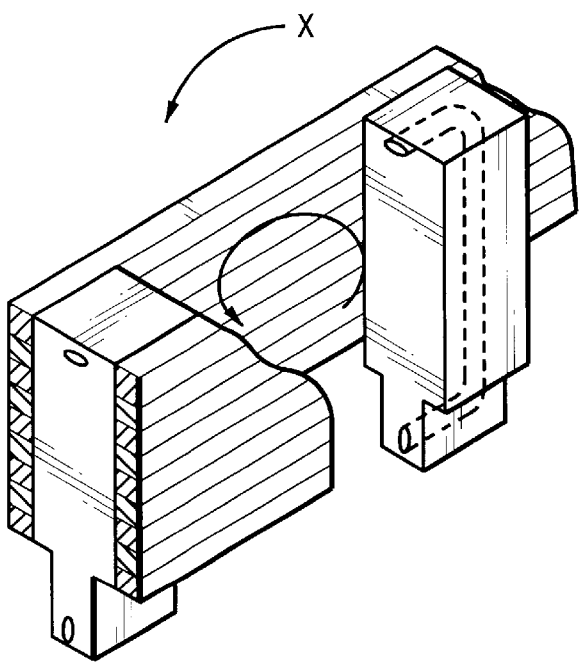
FIG. 5 is a perspective view, partly broken away, of a portion of the rotor end turn region showing a second embodiment of the invention of U.S. Pat. No. 5,644,179.

The inherent pumping action and rotational forces acting in a rotating generator cavity produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Figure 6:
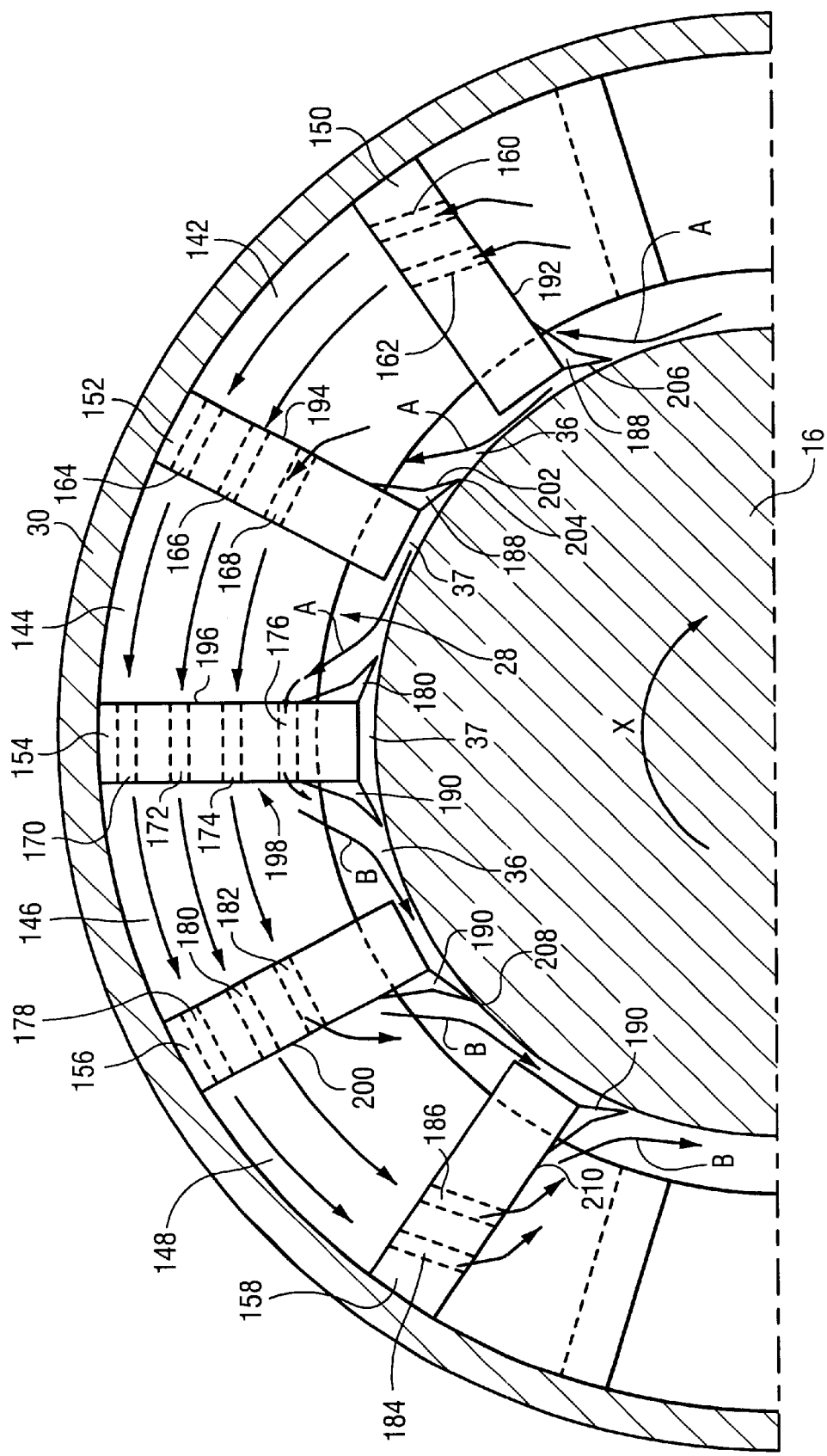
FIG. 6 is a partial section of a rotor endwinding showing spaceblocks having flow-through passages and flow deflectors according to an embodiment of the invention.

Referring now to FIG. 6, there is illustrated a partial section of the rotor endwinding showing endwinding cavities 142, 144, 146, 148 with the direction of rotation indicated by arrow X. In an embodiment of the invention, each spaceblock 150, 152, 154, 156, 158 is provided with at least one flow-through passage 160, 162, 164, 166, 168, 170, 172, 174, 176, 178, 180, 182, 184, 186 for providing a communicating flow between mutually adjacent cooling cavities, most preferably at least at the center and radially outer corner regions of the cooling cavities for increasing heat removal. The flow-through passages preferably extend between respective radially central portions of the mutually adjacent cooling cavities. Another preferred area of coolant flow is adjacent the radially outer end of the spaceblock to communicate flow between otherwise generally stagnate corner regions of the respective cooling cavities.

As described in greater detail below, the passages extend from the downstream side of each respective upstream adjacent cavity to the upstream side of the respective downstream adjacent cavity and thus provide passages through which cooling gas can flow between the mutually adjacent cavities. Thus, each flow-through passage lies generally transverse to the length of its spaceblock, generally circumferentially with respect to the rotor.

As can be seen from the illustrated embodiment, the preferred location and number of flow-through passages in each spaceblock is dependent upon the circumferential position of the spaceblock with respect to the endwinding leading and trailing ends. As also clearly shown in FIG. 6, the preferred orientation of the flow-through passages is also dependent upon the circumferential location. Thus, in the illustrated embodiment, the circumferentially outermost spaceblocks 150, 158 of the endwinding assembly respectively include first and second flow-through passages, one 162, 186 for directing coolant flow to/from into the generally radially central portion of the coolant cavity 142, 148 and one 160, 184 for directing coolant flow to/from the radially outer corner regions of the adjacent cooling cavity 142, 148. In the embodiment illustrated in FIG. 6, these flow-through passages are inclined at an angle of less than 90 degrees with respect to the longitudinal axis of the respective spaceblock 150, 158 to direct flow generally circumferentially and radially, outwardly in the case of the leading spaceblock 150, and inwardly in the case of the trailing spaceblock 158.

Referring again to the embodiment of FIG. 6, the spaceblock 152 downstream from the leading spaceblock 150 has three passages 164, 166, 168 defined therethrough, one passage 164 to flow coolant to the radially outer corner regions of the cavity 144, and passages 166, 168 disposed to flow coolant from/to the central region of the respective adjacent cavities 142, 144. In this example, the flow-through passages of the second spaceblock 152 are oriented generally circumferentially of the rotor axis, at an angle of about 90 degrees with respect to the longitudinal axis of spaceblock 152. In the illustrated embodiment, furthermore, an upstream flow deflector(s) 188, as discussed in greater detail below, is provided on the upstream surface 194 of the spaceblock 152 for deflecting flow from the annular region 36 into the cavity 142, to augment the coolant flow therein.

The next adjacent, middle or intermediate spaceblock 154 includes four circumferentially disposed flow-through passages 170, 172, 174, 176, three disposed in positions generally corresponding to those of the second spaceblock and the fourth circumferential flow-through passage 176 provided adjacent the radially inner extent of the endwinding 28. In the illustrated embodiment, upstream and downstream flow deflectors 188, 190, as discussed in greater detail below, are provided on the upstream and downstream surfaces 196, 198 of the intermediate spaceblock 154, and the radially innermost passage 176 is disposed just radially outside the radially outer extent of the deflector structures 188, 190.

The next adjacent, fourth spaceblock 156 of the illustrated embodiment includes three flow-through passages 178, 180, 182 which are disposed in radial positions generally corresponding to those of the second spaceblock 154. In the presently preferred embodiment, these passages are generally circumferentially disposed, at an angle of about 90 degrees with respect to the longitudinal axis of spaceblock 156. As discussed in greater detail below, a downstream flow deflector 190 is provided on the downstream surface 200 of the fourth spaceblock to guide and direct at least some of the flow from passage 182 to annular region 36, to flow under and about downstream adjacent spaceblock 158.

As noted above, to increase coolant flow into the respective endwinding cavities, in accordance with a further feature of the presently preferred embodiment of the invention, at least one of the spaceblocks is provided with a flow deflector 188 on the forward facing or upstream surface thereof, which is on the downstream side of the upstream adjacent cavity, and/or a flow deflector 190 on the rearward facing or downstream surface thereof, which is on the upstream side of the downstream adjacent cavity, with respect to the direction of coolant flow across the bottom of the cavity. The flow deflector(s) are provided at the radially inward end of the respective spaceblock. The forward facing or upstream flow deflector 188 is provided for increasing the amount of cooling fluid forced into the cavity, thereby increasing the coolant flow inside the cavity, to thereby increase heat removal from the respective cavity. In the illustrated embodiment, the upstream flow deflector extends in an upstream direction from the spaceblock a distance of at least about 20% and more preferably about 20–40% of the circumferential dimension of the respective cavity radially inner end. Further, in the illustrated embodiment, the flow deflector 188 extends downwardly, that is radially inwardly, so as to capture about one half of the radial dimension of the gap 37 that is defined between the spaceblock and the spindle 16.

More specifically, each upstream flow deflector includes a generally continuously curved upper surface 202 terminating at a radially inner edge 204. As illustrated, the radially inner edge of the flow deflector, which defines a flow intercepting line along at least a portion of the depth of the spaceblock, extends below the radially inner surface of the spaceblock so as to intercept and redirect flow otherwise destined for the gap 37 between the spaceblock and the spindle 16. The surface 206 of the flow deflector downstream of the radially inner edge 204 defines a generally gradual transition to the radially inner surface of the respective spaceblock.

To guide and direct the flow into the respective cavity and along the respective spaceblock, as shown by coolant flow arrows A, the curved upper surface 202 of the flow deflector 188 extends upwardly along the respective spaceblock upstream surface a distance greater than the distance by which the flow deflector extends below the spaceblock radially inner surface.

In the illustrated embodiment, each downstream flow deflector 190, like the upstream flow deflectors, extends in a downstream direction from the surface of the spaceblock a distance of at least about 20% and more preferably about 20–40% of the circumferential dimension of the respective cavity radially inner end. Further, in the illustrated embodiment, the flow deflectors 190 extend downwardly, that is radially inwardly, to a downstream edge 208 that is about one half of the radial dimension of the gap 37 that is defined between the spaceblock and the spindle, to guide and direct coolant flow thereto and around and about the downstream adjacent spaceblock radially inner end, as shown by coolant flow arrows B.

In a presently preferred embodiment, each flow deflector 188, 190 is provided to span a substantial portion of the depth or axial dimension of the cavity, for example, at least about 75% and more preferably on the order of 100% of the depth of the cavity. In the alternative, however, each flow deflector can extend only a part depth or part axially of the spaceblock so as to leave at least one bypass flow region for flow to the next downstream adjacent cavity. According to this alternative, a partial depth flow deflector may be disposed to span the part depth of the cavity from adjacent one endwinding wall of the cavity, adjacent the other endwinding wall of the cavity, or generally centrally of its associated spaceblock. In an exemplary embodiment, a single flow deflector 188, 190 is provided to span at least about one half of the depth of the associated spaceblock. According to a further alternate embodiment, two or more axially aligned flow deflectors may be provided, each spanning a portion of the axial dimension or depth of the cavity. In this manner, at least one bypass flow region is provided for flow to the next downstream adjacent cavity.

In operation, rotor rotation will cause cooling gas to be drawn through the gas inlet 34 into the annular region 36 between the endwindings 28 and the rotor spindle 16. A kinetic pressure head will be present which will drive the cooling the gas to and along the flow deflector 188. Thus, referring to FIG. 6, the cooling gas flows along the flow deflector 188 of spaceblock 150 and along the upstream surface 192 of the spaceblock. At least a portion of that coolant gas flows into the flow-through passages 162, 160 defined in spaceblock 150. As noted above, the flow-through passages in this most upstream of the spaceblocks of the endwinding are advantageously disposed at an angle of less than 90 degrees with respect to the longitudinal axis of the spaceblock so that they are inclined. This facilitates flow radially outwardly into the downstream adjacent cavity 142.

In addition to the coolant flow into cavity 142 through passages 160, 162 in spaceblock 150, coolant flow is driven into and deflected into cavity 142 from the annular region 36 as shown by arrow A therein. Because the deflector 188 intercepts flow that might otherwise continue into and through the gap 37 between the spaceblock 152 and spindle 16, the coolant flow through the respective cavity 152 is increased to thereby increase heat transfer. The coolant flow from passages 160, 162 flows generally circumferentially in the illustrated embodiment to spaceblock 152 where it flows into and through passages 164, 166, 168. As mentioned above, in the illustrated embodiment, spaceblock 152 has three flow-through passages, two 164, 166 to receive flow from the central region and radially outer region of the cavity, and one 168 disposed to receive flow from the central and radially inner regions of the cavity. As is apparent, the generally circumferential flow provided in the illustrated embodiment substantially eliminates the coolant gas starved central and corner regions of the cavity 142 seen with the conventional circulatory flow.

Referring to the next downstream adjacent cavity 144, once again, in addition to the coolant flow into the cavity through passages 164, 166, 168 in spaceblock 152, coolant flow is driven into and deflected into cavity 144 from the annular region 36 as shown by arrow A therein. Because the deflector 188 intercepts flow that might otherwise continue into and through the gap 37 between the spaceblock 154 and spindle 16, the coolant flow through the respective cavity is increased to thereby increase heat transfer. Meanwhile, the coolant flow from passages 164, 166, 168 flows generally circumferentially in the illustrated embodiment to spaceblock 154 where it flows into and through passages 170, 172, 174, 176. In this embodiment, spaceblock 154 has four passages, one 170 to receive flow from the radially outer region of the cavity, two 172, 174 to receive flow generally from the central region of the cavity, and one 176 disposed to receive flow from the radially inner region of the cavity 144.

Referring to the next downstream adjacent cavity 146, in the illustrated embodiment, coolant flow is generally limited to the coolant flow into the cavity through passages 170, 172, 174, 176 in spaceblock 154. In this embodiment, the downstream spaceblock 156 has three passages 178, 180, 182, one 178 to receive flow from the radially outer region of the cavity, and two 180, 182 to receive flow generally from the central region of the cavity 146. Once again, the coolant flow from passages 170, 172, and 174 flows generally circumferentially in the illustrated embodiment to spaceblock where it flows into and through passages 178, 180, 182. However, in the illustrated embodiment, at least a portion of the coolant flow from the radially innermost passage 176 flows along downstream flow deflector 190 into the annular region for flow under, around and about the radially inner end of spaceblock 156.

Finally, referring to the next downstream adjacent cavity 148, in the illustrated embodiment, coolant flow is generally limited to the coolant flow into the cavity through passages 178, 180, 182 in spaceblock 156. In this embodiment, the downstream spaceblock 158, as noted above, has two inclined passages 184, 186, one 184 to receive flow from the radially outer region of the cavity and one 186 to receive flow generally from the central region of the cavity. Once again, the coolant flow from passages 178, 180 flows generally circumferentially in the illustrated embodiment to spaceblock 158 where it flows into and through passages 184, 186. However, in the illustrated embodiment, at least a portion of the coolant flow from passage 182 flows along downstream flow deflector 190 into the annular region 36 for flow under, around and about the radially inner end of spaceblock 158.

As illustrated, the outlet flow from passages 184, 186 flows generally radially inwardly along the downstream surface 210 of spaceblock 158, and along flow deflector 190 into the annular region 36.

It can thus be seen that with the combination of flow through the spaceblocks 150, 152, 154, 156, 158 and the deflectors 188, 190 to promote flow into the cavities 142, 144, 146, 148, increased coolant flow is provided, particularly to the normally coolant flow starved regions of the cavities, including the central regions and the radially outward regions of the cavities.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and endwindings extending axially beyond at least one end of said body portion;

at least one spaceblock located between adjacent said endwindings so as to define first and second cavities adjacent said spaceblock and between mutually adjacent endwindings;

at least one said spaceblock having a passage defined therethrough, said passage extending between a first surface of said spaceblock facing said first cavity adjacent thereto and a second surface of said spaceblock facing said second cavity adjacent thereto; thereby to provide for cooling flow communication between said first and second cavities through said spaceblock.

2. The dynamoelectric machine of claim 1, wherein said passage extends through a radial mid-section of said spaceblock so as to flow cooling gas generally between central regions of said first and second cavities.

3. The dynamoelectric machine of claim 1, wherein said first and second surfaces of said spaceblock are respective circumferentially oriented surfaces of said spaceblock.

4. The dynamoelectric machine of claim 1, further comprising a flow deflector provided adjacent a radially inner end of at least one of said first and second surfaces for directing flow either into said first cavity or out of said second cavity, respectively.

5. The dynamoelectric machine of claim 4, wherein at least one said spaceblock has a flow deflector disposed on each of the first and second surfaces thereof.

6. The dynamoelectric machine of claim 1, wherein a plurality of said spaceblocks have a said passage formed therethrough.

7. The dynamoelectric machine of claim 1, wherein there are a plurality of passages defined through said spaceblock, at least one said passage flowing cooling gas generally between central regions of said first and second cavities.

8. The dynamoelectric machine of claim 7, wherein at least one of said plurality of passages is inclined at an angle of less than 90 degrees with respect to a longitudinal axis of said spaceblock.

9. A gas cooled dynamoelectric machine, comprising:

a rotor having a spindle and a body portion;

a rotor winding comprising axially extending coils disposed on said body portion and spaced, concentric endwindings extending axially beyond at least one end of said body portion, said endwindings and said spindle defining a space therebetween;

a plurality of spaceblocks located between adjacent ones of said endwindings;

a plurality of cavities being defined between mutually adjacent endwindings and spaceblocks;

at least one said spaceblock having a passage defined therethrough, said passage extending between a first surface of said spaceblock facing a first cavity adjacent thereto and a second surface of said spaceblock facing a second cavity adjacent thereto; thereby to provide for cooling flow communication between said first and second cavities through said spaceblock.

10. The dynamoelectric machine of claim 9, wherein said passage extends through a radial mid-section of said spaceblock so as to flow cooling gas generally between central regions of said first and second cavities.

11. The dynamoelectric machine of claim 9, further comprising a flow deflector provided adjacent a radially inner end of at least one of said first and second surfaces for directing flow either into said first cavity or out of said second cavity, respectively.

12. The dynamoelectric machine of claim 11, wherein at least one said spaceblock has a flow deflector disposed on each of the first and second surfaces thereof.

13. The dynamoelectric machine of claim 9, wherein a plurality of said spaceblocks have a said passage formed therethrough.

14. The dynamoelectric machine of claim 9, wherein there are a plurality of passages defined through said spaceblock, at least one said passage flowing cooling gas generally between central regions of said first and second cavities.

15. The dynamoelectric machine of claim 14, wherein at least one of said plurality of passages is inclined at an angle of less than 90 degrees with respect to a longitudinal axis of said spaceblock.

16. A method of cooling endwindings in a dynamoelectric machine comprising a rotor having a body portion, axially extending coils and endwindings extending axially beyond at least one end of said body portion; a plurality of spaceblocks disposed between said endwindings; and a plurality of cavities being defined between mutually adjacent endwindings and spaceblocks; the method comprising:

providing at least one passage through at least one said spaceblock, said passage extending between a first surface of said spaceblock facing a first cavity adjacent thereto and a second surface of said spaceblock facing a second cavity adjacent thereto; and rotating said rotor so that a pressure head drives a cooling gas into said first cavity, into said passage, and into said second cavity, thereby providing cooling flow communication between said first and second cavities through said spaceblock.

17. A method as in claim 16, wherein said passage extends through a radial mid-section of said spaceblock whereby said cooling flow communication is provided between central regions of said first and second cavities.

18. A method as in claim 16, wherein the rotor further comprises a flow deflector provided adjacent a radially inner end of at least one of said first and second surfaces and further comprising flowing cooling gas one of into and out of said first and second cavities, respectively, along said flow deflector.

19. A method as in claim 16, wherein said spaceblock has a flow deflector disposed on each of the first and second surfaces thereof and further comprising flowing cooling gas into said first cavity along the flow deflector on said first surface and flowing cooling gas out of said second cavity along said flow deflector on said second surface.

20. A method as in claim 16, wherein there are a plurality of passages defined through said spaceblock and wherein cooling gas is directed through said passages to at least radially outer and and central regions of said second cavity.

21. A method as in claim 20, wherein at least one of said plurality of passages is inclined at an angle of less than 90 degrees with respect to a longitudinal axis of said spaceblock whereby cooling flow is directed at an angle into said second cavity.

* * * * *